United States Patent
Gierc et al.

(10) Patent No.: US 6,330,929 B1
(45) Date of Patent: *Dec. 18, 2001

(54) RACK BUSHING FOR FLUID POWER ASSISTED RACK AND PINION STEERING GEAR ASSEMBLY

(75) Inventors: Daniel B. Gierc, Shelby Township; John A. Pietraszewski, Berkley; Robert E. Feindel, Sterling Heights, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,107

(22) Filed: Oct. 6, 1999

(51) Int. Cl.[7] ........................................ B62D 5/06
(52) U.S. Cl. ..................... 180/428; 384/16; 277/585
(58) Field of Search ............................. 180/414, 418, 180/428, 427, 442; 384/16; 277/551, 572, 573, 585, 636

(56) References Cited

U.S. PATENT DOCUMENTS

| | | | |
|---|---|---|---|
| 3,075,779 | * 1/1963 | Holdham | 277/37 |
| 4,127,186 | * 11/1978 | Koyano et al. | 180/148 |
| 4,301,691 | * 11/1981 | Walter | 74/422 |
| 4,369,852 | * 1/1983 | Nishikawa et al. | 180/148 |
| 4,373,599 | * 2/1983 | Walter et al. | 180/148 |
| 4,608,876 | * 9/1986 | Rosell | 74/388 |
| 4,996,905 | * 3/1991 | Borror | 91/375 A |
| 5,181,581 | 1/1993 | Engler . | |
| 5,709,283 | 1/1998 | Nief . | |
| 5,788,009 | * 8/1998 | Lee | 180/428 |
| 6,155,375 | * 12/2000 | Gierc et al. | 180/428 |

* cited by examiner

Primary Examiner—Anne Marie Boehler
Assistant Examiner—Tony Winner
(74) Attorney, Agent, or Firm—Tarolli, Sundheim, Covell, Tummino & Szabo L.L.P.

(57) ABSTRACT

A fluid power assisted rack and pinion steering apparatus (10) includes a rack (24) connectable with steerable wheels of the vehicle. The rack (24) is movable in opposite directions to turn the steerable wheels in opposite directions. A housing (20) partially encloses the rack (24) and defines a fluid chamber (40). The housing (20) has an inner surface (30). A bushing (60) encircles the rack (24) and supports the rack for sliding movement relative to the housing (20). The bushing (60) has a recess (70) on its outer periphery. A portion (79) of the housing (20) is deformed radially inward into the recess (70) to secure the bushing (60) to the housing (20). An annular first seal member (90) encircles the rack (24) and extends between the rack and the bushing (60). An annular second seal member (100) encircles the bushing (60) and extends between the bushing and the inner surface (30) of the housing (20). A bellows member (120) encircles the rack (24) and has an end portion (126) secured to the bushing (60).

10 Claims, 2 Drawing Sheets

RACK BUSHING FOR FLUID POWER ASSISTED RACK AND PINION STEERING GEAR ASSEMBLY

Background Of The Invention

1. Technical Field

The present invention relates to a rack and pinion steering gear assembly and, in particular, is directed to a bushing for a fluid power assisted rack and pinion steering gear assembly.

2. Description of the Prior Art

A typical fluid power assisted rack and pinion steering gear assembly for a vehicle includes a rack which extends axially through a chamber inside a hydraulic cylinder. The ends of the rack project from the ends of the hydraulic cylinder and are connected with steering linkage which connects to steerable vehicle wheels.

A piston is fixed to the rack within the chamber. Rotation of the vehicle steering wheel actuates a hydraulic valve and causes hydraulic fluid under pressure to act against the piston. The force exerted by the hydraulic fluid moves the piston within the chamber, causing the rack to move axially. The axial movement of the rack moves the steering linkage which, in turn, causes the steerable wheels to turn.

To prevent hydraulic fluid from flowing out of the chamber, it is necessary to seal the ends of the chamber through which the rack projects. It is also desirable to support the rack at least at one end of the chamber for axial movement within the chamber. Finally, it is common to enclose the ends of the chamber with bellows attached to the hydraulic cylinder to prevent the ingress of moisture, dirt, or other contaminant.

SUMMARY OF THE INVENTION

The present invention is a fluid power assisted rack and pinion steering apparatus for a vehicle, comprising a rack connectable with steerable wheels of the vehicle. The rack is movable in opposite directions to turn the steerable wheels in opposite directions. A housing partially encloses the rack and defines a fluid chamber. The housing has an inner surface. A bushing encircles the rack and supports the rack for sliding movement relative to the housing. The bushing has a recess on its outer periphery. A portion of the housing is deformed radially inward into the recess to secure the bushing to the housing. An annular first seal member encircles the rack and extends between the rack and the bushing. An annular second seal member encircles the bushing and extends between the bushing and the inner surface of the housing. A bellows member encircles the rack and has an end portion secured to the bushing.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 3 is a sectional view taken along line 3—3 of FIG. 2.

DESCRIPTION OF A PREFERRED EMBODIMENT

Figure 1:
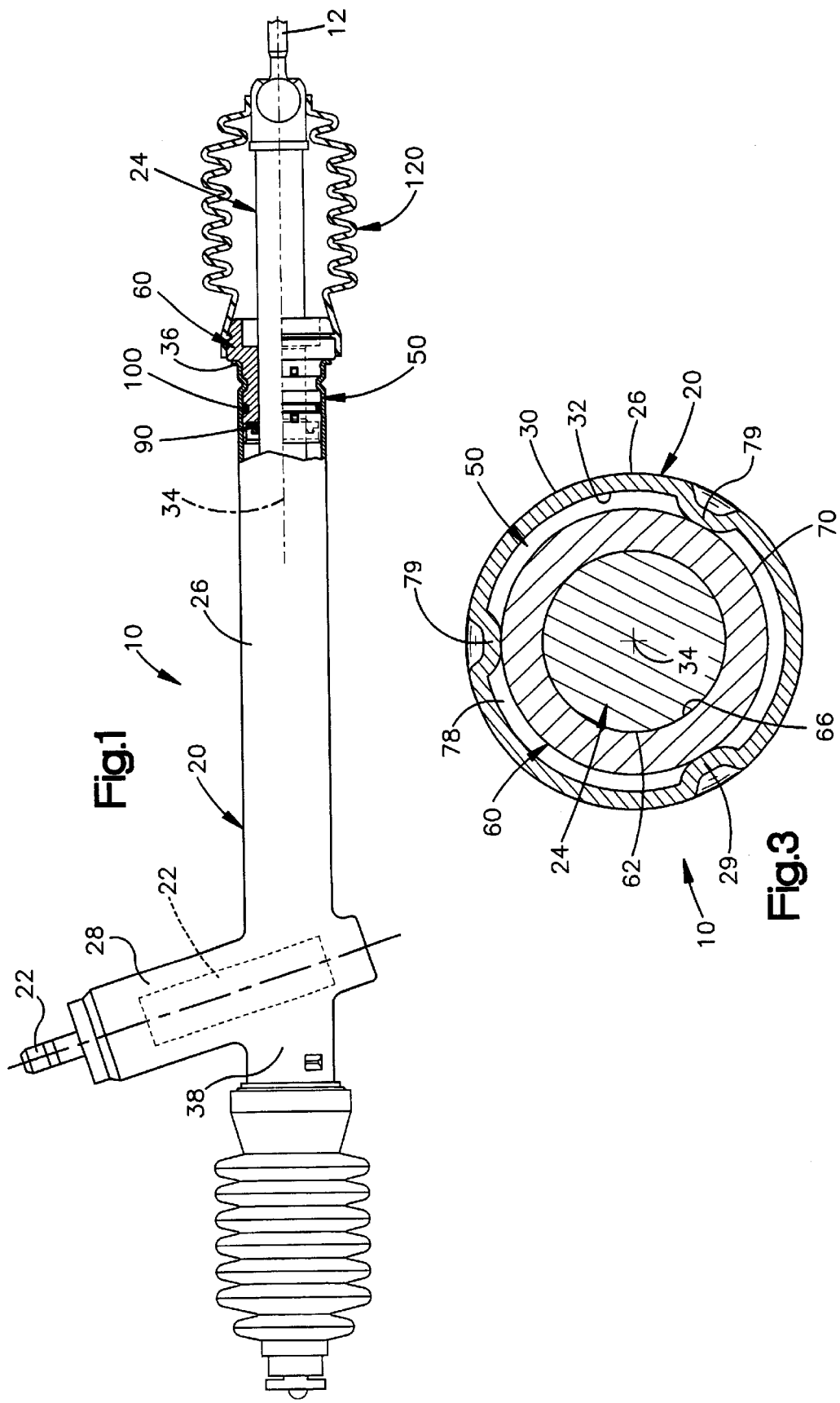
FIG. 1 is a schematic view of a vehicle fluid power assisted rack and pinion steering gear constructed in accordance with the present invention.

The present invention relates to a fluid power assisted rack and pinion steering gear and, in particular, is directed to a bushing assembly for a fluid power assisted rack and pinion power steering gear. The present invention is applicable to various steering gear constructions. As representative of the present invention, FIG. 1 illustrates a rack and pinion power steering gear 10. The steering gear 10 is connected with a pair of steerable vehicle wheels 15 in a known manner by steering linkage 12 at one end of the steering gear and by similar steering linkage (not shown) at the other end of the steering gear.

The steering gear 10 includes a housing 20, a pinion 22, and a rack 24. The housing 20 has a rack portion 26 and a transversely extending pinion portion 28. The pinion 22 is disposed in the pinion portion 28 of the housing 20. The pinion 22 has teeth (not shown) which meshingly engage teeth (not shown) on the rack 24 inside the housing 20 at the intersection of the pinion portion 28 and the rack portion 26.

The rack portion 26 of the housing 20 has a tubular, cylindrical configuration including parallel inner and outer surfaces 30 and 32 (FIG. 2) centered on an axis 34. The housing has first and second terminal ends 36 and 38. The inner surface 30 in the rack portion 26 defines a fluid chamber 40 (FIG. 2) within the housing 20.

The rack 24 is centered on the axis 34 and extends axially through the fluid chamber 40 in the housing 20. The rack 24 has a cylindrical outer surface 42. Opposite ends of the rack 24 project axially beyond the terminal ends 36 and 38 of the housing 20 and are connected to the steering linkages 12.

A piston (not shown) is fixed to the rack 24 inside the fluid chamber 40. Upon rotation of the vehicle steering wheel (not shown), fluid under pressure in the fluid chamber 40 acts against the piston, causing the rack 24 to move axially within the housing 20. Such axial movement of the rack 24 in opposite directions moves the steering linkages 12 in opposite directions, and thus turns the steerable wheels 15 in opposite directions.

A bushing assembly 50 is located at the first terminal end 36 of the housing 20. The bushing assembly 50 includes a rack bushing 60, a first seal member 90, and a second seal member 100. The bushing assembly 50 encircles the rack 24 and is centered on the axis 34. The bushing assembly 50 is connected to the housing 20 in a manner described below and supports the rack 24 for axial movement relative to the housing.

The rack bushing 60 is molded as one piece from a plastic material, preferably a 45% glass-filled polyester such the 545 Rynite® brand polyester available from E.I. DuPont de Nemours & Co. The bushing 60 has a tubular, cylindrical configuration centered on the axis 34. A relatively narrow diameter inner part 62 of the bushing 60 is received within the housing 20. A relatively wide diameter outer part 64 of the bushing 60 projects axially and radially from the terminal end 36 of the housing 20. The bushing 60 has a cylindrical inner surface 66 that engages the outer surface 42 of the rack 24 and supports the rack for sliding movement relative to the bushing.

The inner part 62 of the bushing 60 has a generally cylindrical outer side surface 70. The outer side surface 70 extends axially between an inner end face 72 of the bushing 60 and a radially extending shoulder surface 74 on the outer part 62 of the bushing 60. Two annular grooves 76 and 78 are formed on the outer surface 70 of the inner part 62 of the bushing 60. The groove 76 is closer to the inner end face 72 of the bushing 60; the groove 78 is closer to the outer part 64 of the bushing. The grooves 76 and 78 extend circumferentially around the outer periphery of the bushing 60.

The material of the housing 20 is deformed radially inward as the primary method of securing the bushing 60 in the housing. Specifically, the material of the housing 20 is crimped radially inward into the annular groove 78 in the inner part 62 of the bushing 60, at at least three locations 79 around the periphery of the housing. The engagement of the deformed material 79 of the housing 70 in the groove 78 of the bushing 60 secures the bushing in the housing.

Figure 2:
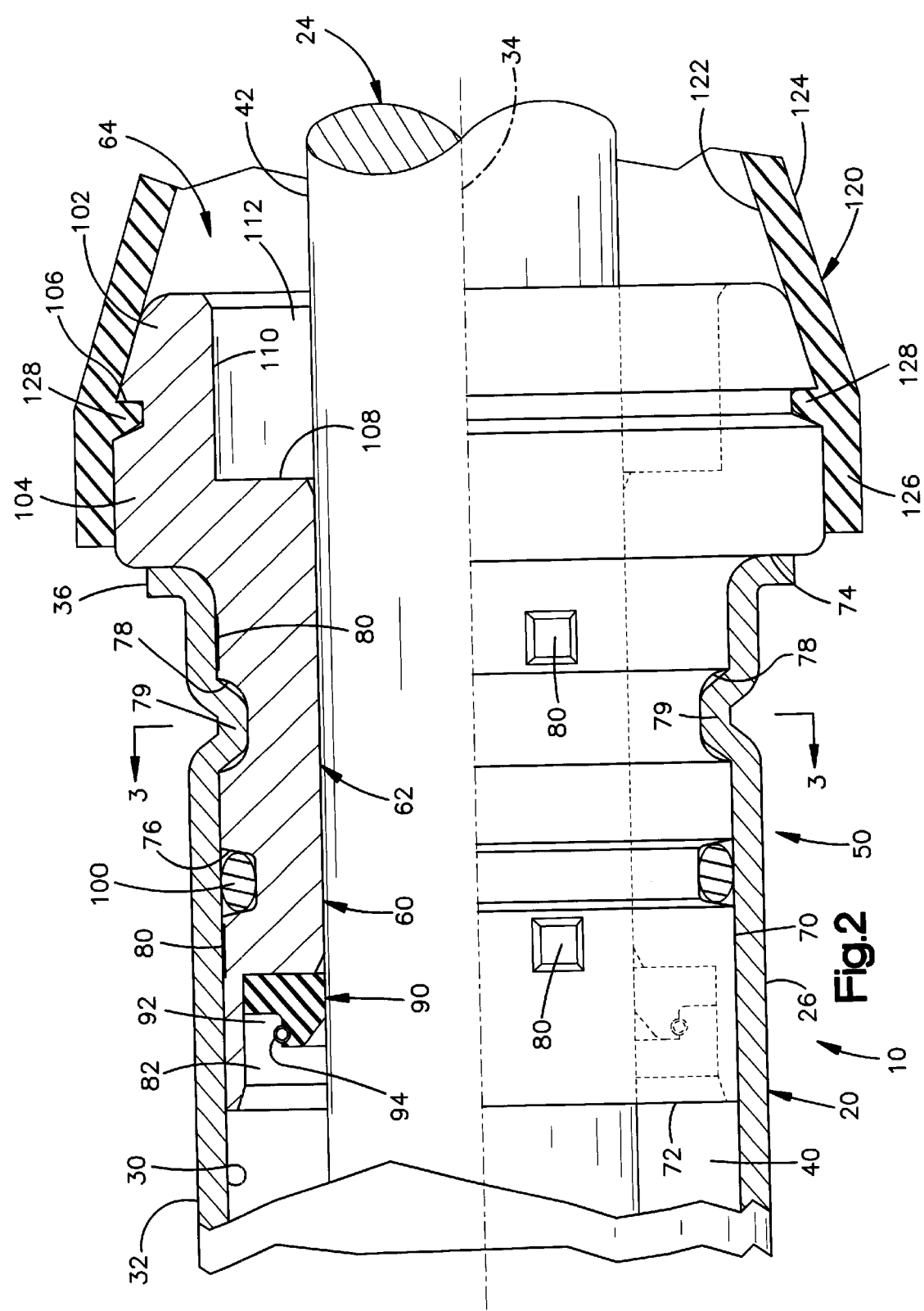
FIG. 2 is an enlarged sectional view of a portion of the steering gear of FIG. 1.

In addition, the outer side surface 70 of the inner part 62 of the bushing 60 has an interference fit within the inner surface 30 of the housing 20. A plurality of crush pads 80 on the outer side surface 70 of the bushing 60, shown undeformed in the lower half of FIG. 2, are designed to deform or crush to help hold the bushing in the housing 20.

The inner part 62 of the bushing 60 has an annular recess 82 in the inner end face 72 of the bushing. The first seal member 90 is pressed into the recess 82. The first seal member 90 is preferably made of an elastomeric material, such as Viton® or hydrogenated Nitrile®.

The first seal member 90 has an annular groove 92 in which a metallic garter spring 94 is located. The garter spring 94 exerts a radially inward force on a portion of the first seal member 90 to press an inner surface 96 of the seal member 90 against the outer surface 40 of the rack 24. The first seal member 90 thus seals between the rack 24 and the bushing 60.

The second seal member 100 is an O-ring located in the annular groove 76 in the outer surface 70 of the inner part 62 of the bushing 60. The second seal member 100 blocks fluid flow between the outside of the bushing 60 and the inside of the housing 20.

The outer part 64 of the bushing 60 has a tapered axial end portion 102 and a cylindrical portion 104, separated from each other by a single annular groove 106. The outer part 64 of the bushing 60 includes an annular, radially extending rack stop surface 108 and a cylindrical, axially extending surface 110. The surfaces 108 and 110 together define an annular recess 112 in the outer part 64 of the bushing 60. When the steerable wheels 15 are turned to a maximum limit in a particular direction, the steering linkage 12 is received in the recess 112 and abuts the rack stop surface 108.

The steering gear 10 includes a bellows member 120. The bellows member 120 is made of a suitable flexible material such as rubber. The bellows member 120 has inner and outer surfaces 122 and 124, respectively, and an end portion 126. A circumferentially extending ridge 128 is formed on the inner surface 122 of the end portion 126 of the bellows member 120.

To assemble the bellows member 120 to the steering assembly 10, the end portion 126 of the bellows member is stretched radially and forced over the tapered axial end portion 102 of the bushing 60. The ridge 128 on the bellows member 120 is received in the groove 106 on the outer surface of the outer part 64 of the bushing 60. The engagement of the ridge 128 of the bellows 120 in the groove 106 of the bushing 60 secures the bellows member to the bushing. No clamp is needed to secure the bellows 120 to the bushing 60.

From the above description of the invention, those skilled in the art will perceive improvements, changes and modifications. Such improvements, changes and modifications within the skill of the art are intended to be covered by the appended claims.

What is claimed is:

1. A fluid power assisted rack and pinion steering apparatus for a vehicle, said apparatus comprising:

a rack connectable with steerable wheels of the vehicle, said rack having an axis and being axially movable in opposite directions to turn the steerable wheels in opposite directions;

a housing partially enclosing said rack and defining a fluid chamber, said housing having an inner surface;

a one-piece, plastic bushing encircling said rack and supporting said rack for sliding movement relative to said housing, said one-piece, plastic bushing having a recess on its outer periphery, a portion of said housing being deformed radially inward into said recess to secure said one-piece, plastic bushing to said housing;

an annular first seal member for sealing said fluid chamber, said first seal member encircling said rack and extending between said rack and said one-piece, plastic bushing, said first seal member being disposed completely between said rack and said one-piece, plastic bushing;

an annular, fluid-tight second seal member spaced axially from said first seal member for sealing said fluid chamber, said second seal member encircling said one-piece, plastic bushing and being located in a circumferential groove in said one-piece plastic bushing and said second seal member extending between said bushing and said inner surface of said housing, said one-piece, plastic bushing having a portion projecting axially outward from said housing; and a bellows member encircling said rack and having an end portion secured to said portion of said one-piece, plastic bushing.

2. A steering apparatus as set forth in claim 1 wherein said recess in said bushing is a first groove extending circumferentially around said outer periphery of said bushing.

3. A steering apparatus as set forth in claim 2 wherein said housing is crimped radially inward at least three locations into engagement in said first groove in said bushing.

4. A steering apparatus as set forth in claim 2 wherein said second seal member is received in a second groove spaced axially from said first groove on the outer periphery of said bushing.

5. A steering apparatus as set forth in claim 4 wherein said second groove is disposed between said first groove and said bellows member.

6. A steering apparatus as set forth in claim 1 wherein said end portion of said bellows member is secured to said bushing without a clamp.

7. A steering apparatus as set forth in claim 6 wherein said bushing includes a circumferentially extending third groove which receives a circumferentially extending inner ridge on said end portion of said bellows member to secure said bellows member to said bushing.

8. A steering apparatus as set forth in claim 1 wherein said recess in said bushing is a first groove extending circumferentially around said outer periphery of said bushing, said housing being crimped radially inward at least three locations into engagement in said first groove in said bushing, said second seal member being received in a second groove on the outer periphery of said bushing disposed between said first groove and said bellows member.

9. A steering apparatus as set forth in claim 8 wherein said end portion of said bellows member is secured to said bushing without a clamp, said bushing including a circumferentially extending third groove which receives a circumferentially extending inner ridge on said end portion of said bellows member to secure said bellows member to said bushing.

10. A fluid power assisted rack and pinion steering apparatus for a vehicle, said apparatus comprising: p1 a rack connectable with steerable wheels of the vehicle, said rack being movable in a first direction to move said steering wheels in said first direction, said rack further being movable in a second direction to move said steering wheels in said second direction, said first direction being opposite said first direction;

a housing partially enclosing said rack and defining a fluid chamber, said housing having an inner surface;

a bushing encircling said rack and supporting said rack for sliding movement relative to said housing, said bushing having a recess on its outer periphery, a portion of said housing being deformed radially inward into said recess to secure said bushing to said housing;

an annular first seal member for sealing said fluid chamber, said first seal member encircling said rack and extending between said rack and said bushing;

an annular second seal member for sealing said fluid chamber, said second seal member encircling said bushing and extending between said bushing and said inner surface of said housing; and a bellows member encircling said rack and having an end portion secured to said bushing.

* * * * *